US011422924B2

(12) United States Patent
Hicks et al.

(10) Patent No.: US 11,422,924 B2
(45) Date of Patent: Aug. 23, 2022

(54) CUSTOMIZABLE TEST SET SELECTION USING CODE FLOW TREES

(71) Applicant: INTERNATIONAL BUSINESS MACHINES CORPORATION, Armonk, NY (US)

(72) Inventors: Andrew Hicks, Wappingers Falls, NY (US); Dale E. Blue, Poughkeepsie, NY (US); Ryan Thomas Rawlins, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 82 days.

(21) Appl. No.: 16/440,751

(22) Filed: Jun. 13, 2019

(65) Prior Publication Data

US 2020/0394125 A1 Dec. 17, 2020

(51) Int. Cl.
*G06F 11/36* (2006.01)
*G06F 16/901* (2019.01)
*G06N 20/00* (2019.01)

(52) U.S. Cl.
CPC ...... *G06F 11/3676* (2013.01); *G06F 11/3688* (2013.01); *G06F 16/9027* (2019.01); *G06N 20/00* (2019.01)

(58) Field of Classification Search
CPC .............. G06F 11/3676; G06F 16/9027; G06F 11/3688; G06N 20/00
See application file for complete search history.

(56) References Cited

U.S. PATENT DOCUMENTS

| 5,153,881 A | 10/1992 | Bruckert |
| 5,185,877 A | 2/1993 | Bissett |

(Continued)

FOREIGN PATENT DOCUMENTS

| JP | H05282272 A | 10/1993 |
| JP | H07121498 A | 5/1995 |

(Continued)

OTHER PUBLICATIONS

Briand et al, "Automating Impact Analysis and Regression Test Selection Based on UML Designs", 2002, [Online], pp. 1-10, [Retrieved from internet on Jun. 7, 2022], <https://ieeexplore.ieee.org/stamp/stamp.jsp?arnumber=1167775> (Year: 2002).*

(Continued)

*Primary Examiner* — S. Sough
*Assistant Examiner* — Zengpu Wei
(74) *Attorney, Agent, or Firm* — Cantor Colburn LLP; Teddi Maranzano

(57) ABSTRACT

A method for identifying optimal tests includes defining functional coverage by a test suite based on a functional coverage model of a System Under Test (SUT). The test suite includes a plurality of tests. The functional coverage model includes a plurality of attributes, each attribute having a set of possible values. The functional coverage model defines possible combinations of values of the attributes as covered by the test suite. A subset of the possible combinations of values is determined. A subset of the plurality of tests is selected that is operative to cover the determined subset of the possible combinations of values. A plurality of trees is generated to represent the selected subset of tests. Complexity of the generated trees is analyzed based on user-specified criteria. An optimal tree is selected from the subset of the plurality of trees to achieve the objective of the test suite.

5 Claims, 5 Drawing Sheets

(56) References Cited

U.S. PATENT DOCUMENTS

| | | |
|---|---|---|
| 5,410,634 A | 4/1995 | Li |
| 5,694,540 A | 12/1997 | Humelsine |
| 5,758,061 A | 5/1998 | Plum |
| 5,758,062 A | 5/1998 | McMahon |
| 6,182,245 B1 | 1/2001 | Akin et al. |
| 6,182,258 B1 | 1/2001 | Hollander |
| 6,378,097 B1 | 4/2002 | Fin et al. |
| 6,415,396 B1 | 7/2002 | Singh et al. |
| 6,601,018 B1 | 7/2003 | Logan |
| 6,718,286 B2 | 4/2004 | Rivin et al. |
| 6,718,485 B1 | 4/2004 | Reiser |
| 6,859,922 B1 | 2/2005 | Baker |
| 6,907,546 B1 | 6/2005 | Haswell et al. |
| 7,024,589 B2 | 4/2006 | Hartman et al. |
| 7,032,212 B2 | 4/2006 | Amir et al. |
| 7,178,063 B1 | 2/2007 | Smith |
| 7,235,358 B2 | 6/2007 | Wohlgemuth |
| 7,315,634 B2 | 1/2008 | Martin |
| 7,363,495 B2 | 4/2008 | Wells |
| 7,386,839 B1 | 6/2008 | Golender |
| 7,552,425 B2 | 6/2009 | Bates et al. |
| 7,596,778 B2 | 9/2009 | Kolawa |
| 7,617,074 B2 | 11/2009 | Beish |
| 7,640,470 B2 | 12/2009 | Lammel |
| 7,721,265 B1 | 5/2010 | Xu |
| 7,752,502 B2 | 7/2010 | Clee |
| 7,861,226 B1 | 12/2010 | Episkopos |
| 7,945,898 B1 | 5/2011 | Episkopos et al. |
| 7,958,400 B2 | 6/2011 | Ur |
| 7,962,798 B2 | 6/2011 | Locasto |
| 8,056,060 B2 | 11/2011 | Bicheno |
| 8,225,194 B2 | 7/2012 | Rechsteiner |
| 8,234,105 B1 | 7/2012 | Aldrich |
| 8,296,445 B1 | 10/2012 | Hackborn |
| 8,296,605 B2 | 10/2012 | John |
| 8,301,757 B2 | 10/2012 | Catlin |
| 8,370,816 B2 | 2/2013 | Farchi et al. |
| 8,479,171 B2 | 7/2013 | Ghosh |
| 8,504,997 B2 | 8/2013 | Tkachuk et al. |
| 8,527,813 B2 | 9/2013 | Budnik |
| 8,549,480 B2 | 10/2013 | Cohen et al. |
| 8,554,811 B2 | 10/2013 | Mariani |
| 8,639,625 B1 | 1/2014 | Ginter |
| 8,649,995 B2 | 2/2014 | Thulasidasan et al. |
| 8,666,723 B2 | 3/2014 | Xie |
| 8,694,958 B1 | 4/2014 | Poiier |
| 8,756,460 B2 | 6/2014 | Blue et al. |
| 8,775,886 B2 | 7/2014 | Mellen |
| 8,806,450 B1 | 8/2014 | Maharana |
| 8,813,033 B2 | 8/2014 | Sreedhar |
| 8,856,129 B2 | 10/2014 | Cai |
| 8,874,477 B2 | 10/2014 | Hoffberg |
| 8,935,673 B1 | 1/2015 | Ashkenazi |
| 8,949,674 B2 | 2/2015 | Mancoridis |
| 8,954,926 B2 | 2/2015 | Braun et al. |
| 8,954,930 B2 | 2/2015 | Kamenz |
| 8,966,453 B1 | 2/2015 | Zamfir |
| 8,997,061 B1 | 3/2015 | Davison |
| 9,009,538 B2 | 4/2015 | D'Alterio et al. |
| 9,037,915 B2 | 5/2015 | D'Alterio et al. |
| 9,063,899 B2 | 6/2015 | Epstein |
| 9,098,635 B2 | 8/2015 | Peri-Glass et al. |
| 9,104,804 B2 | 8/2015 | Best |
| 9,111,033 B2 | 8/2015 | Bates |
| 9,141,520 B2 | 9/2015 | Zheng |
| 9,202,005 B2 | 12/2015 | Goswami et al. |
| 9,286,313 B1 | 3/2016 | Sharangpani |
| 9,317,410 B2 | 4/2016 | Eilam et al. |
| 9,336,122 B2 | 5/2016 | Kilzer et al. |
| 9,454,466 B2 | 9/2016 | Ivrii et al. |
| 9,489,289 B2 | 11/2016 | Hu |
| 9,513,998 B2 | 12/2016 | Coronado |
| 9,529,701 B2 | 12/2016 | Ekambaram et al. |
| 9,600,241 B2 | 3/2017 | Shankar et al. |
| 9,600,401 B1 | 3/2017 | Haischt |
| 9,600,403 B1 | 3/2017 | Raz |
| 9,626,277 B2 | 4/2017 | Thangamani |
| 9,698,819 B1 * | 7/2017 | Baranchik ............... H03M 7/42 |
| 9,720,766 B2 | 8/2017 | Lee |
| 9,734,263 B2 | 8/2017 | Kohavi et al. |
| 9,779,013 B2 | 10/2017 | Narayan et al. |
| 9,857,959 B2 | 1/2018 | Dhawal |
| 9,864,675 B2 | 1/2018 | Ug |
| 9,916,414 B2 | 3/2018 | Jeong |
| 10,073,763 B1 | 3/2018 | Raman |
| 9,990,272 B2 | 6/2018 | Cooper |
| 9,996,452 B2 | 6/2018 | Cooper et al. |
| 10,061,685 B1 | 8/2018 | White |
| 10,152,479 B1 | 12/2018 | Granstrom |
| 10,235,277 B2 | 3/2019 | Herzig et al. |
| 10,270,748 B2 | 4/2019 | Briceno |
| 10,282,274 B2 | 5/2019 | Mola |
| 10,296,446 B2 | 5/2019 | D'Andrea et al. |
| 10,338,993 B1 | 7/2019 | Lekivetz et al. |
| 10,383,553 B1 | 8/2019 | Glenn |
| 10,417,282 B1 * | 9/2019 | Zuber ............... G06F 16/9027 |
| 10,430,318 B1 | 10/2019 | Ansari |
| 10,545,855 B1 | 1/2020 | Jayaswal |
| 10,560,539 B1 | 2/2020 | Loch et al. |
| 10,637,853 B2 | 4/2020 | Lindemann |
| 10,713,151 B1 | 7/2020 | Zinger et al. |
| 10,754,756 B2 | 8/2020 | Ocariza, Jr. et al. |
| 10,776,464 B2 | 9/2020 | Wilson |
| 2003/0233600 A1 | 12/2003 | Hartman |
| 2004/0154001 A1 | 8/2004 | Haghighat et al. |
| 2006/0070048 A1 * | 3/2006 | Li ............... G06F 11/3676 717/144 |
| 2006/0179386 A1 | 8/2006 | Pushpavanam |
| 2008/0065931 A1 | 3/2008 | Coulter |
| 2008/0104577 A1 | 5/2008 | Holden |
| 2008/0148236 A1 * | 6/2008 | Huang ............... G06F 11/3684 717/124 |
| 2008/0163165 A1 | 7/2008 | Shitrit |
| 2008/0172652 A1 | 7/2008 | Davia et al. |
| 2009/0249123 A1 | 10/2009 | Chow |
| 2010/0023928 A1 | 1/2010 | Hentschel et al. |
| 2010/0064190 A1 | 3/2010 | Ward et al. |
| 2010/0100871 A1 | 4/2010 | Celeskey |
| 2010/0274520 A1 * | 10/2010 | Ur ............... G06F 11/3676 702/123 |
| 2010/0287534 A1 | 11/2010 | Vangala et al. |
| 2011/0016457 A1 | 1/2011 | Artzi et al. |
| 2011/0145653 A1 | 6/2011 | Broadfoot |
| 2012/0191443 A1 | 7/2012 | Amalfitano |
| 2012/0253728 A1 | 10/2012 | Chamas |
| 2012/0260132 A1 * | 10/2012 | Blue ............... G06F 11/3676 714/38.1 |
| 2013/0103983 A1 * | 4/2013 | Tzoref-Brill ........ G06F 11/3676 714/26 |
| 2013/0125090 A1 | 5/2013 | Durand et al. |
| 2013/0152047 A1 | 6/2013 | Moorthi |
| 2014/0013307 A1 | 1/2014 | Hansson |
| 2014/0059081 A1 | 2/2014 | Farchi et al. |
| 2014/0095933 A1 | 4/2014 | Griesinger |
| 2014/0245267 A1 | 8/2014 | Wang et al. |
| 2014/0372083 A1 | 12/2014 | Hsu et al. |
| 2015/0094997 A1 | 4/2015 | Ivrii et al. |
| 2015/0106653 A1 | 4/2015 | Adler et al. |
| 2015/0378879 A1 | 12/2015 | Ding |
| 2016/0140027 A1 | 5/2016 | Ug |
| 2016/0305853 A1 | 10/2016 | Senf |
| 2016/0378618 A1 | 12/2016 | Cmielowski et al. |
| 2017/0060734 A1 | 3/2017 | Raz et al. |
| 2017/0083429 A1 | 3/2017 | Pekelis et al. |
| 2017/0103013 A1 | 4/2017 | Grechanik |
| 2017/0132119 A1 | 5/2017 | Xu et al. |
| 2017/0199810 A1 | 7/2017 | Hamilton |
| 2017/0220800 A1 | 8/2017 | Niemelä |
| 2017/0262361 A1 | 9/2017 | Francis |
| 2017/0270035 A1 | 9/2017 | Nie |
| 2018/0024911 A1 | 1/2018 | Kruszewski et al. |
| 2018/0052725 A1 | 2/2018 | Hannson |
| 2018/0095867 A1 | 4/2018 | Varadarajan et al. |
| 2018/0121336 A1 | 5/2018 | Ayyappan et al. |

(56) References Cited

U.S. PATENT DOCUMENTS

| | | |
|---|---|---|
| 2018/0189609 A1 | 7/2018 | Park et al. |
| 2018/0293156 A1 | 10/2018 | Zeng |
| 2018/0300226 A1 | 10/2018 | Manolios |
| 2018/0314577 A1 | 11/2018 | Gorjiara et al. |
| 2018/0329807 A1 | 11/2018 | Atyam |
| 2019/0018761 A1* | 1/2019 | Ramraz ............... G06F 11/3688 |
| 2019/0332523 A1 | 10/2019 | Gefen |
| 2019/0334807 A1 | 10/2019 | Clark et al. |
| 2019/0370274 A1* | 12/2019 | Yokoyama ........... G06K 9/6255 |
| 2020/0104426 A1* | 4/2020 | Wu ......................... G06N 20/00 |
| 2020/0201741 A1 | 6/2020 | Saha et al. |
| 2020/0201822 A1* | 6/2020 | Wang .................. G06F 16/1873 |
| 2020/0213199 A1* | 7/2020 | Sethi ........................ H04L 41/12 |
| 2021/0156911 A1 | 5/2021 | Motika et al. |
| 2021/0349812 A1 | 11/2021 | Culibrk et al. |

FOREIGN PATENT DOCUMENTS

| | | |
|---|---|---|
| JP | H07139507 A | 5/1995 |
| WO | 2016138953 A1 | 9/2016 |
| WO | 2018162048 A1 | 9/2018 |

OTHER PUBLICATIONS

Anonymous, "A Method and System for Providing Collaborative Platform as a Service for Aiding Machine Learning Development," IP.com (IPCOM000256095D). Nov. 2, 2018. 5 pages.

Anonymous, "Black Hole Testing—Machine Learning Program Behavior Patterns from Massive Automated Test Results," IP.com (IPCOM000243987D). Nov. 4, 2015. 8 pages.

Anonymously Disclosed "A system and method for setting breakpoints automatically by comparing correct and ncorrect runs" IP.com No. IPCOM000252399D, Publication Date: Jan. 8, 2018, 5 pages.

Anonymously Disclosed "Advanced Interrogative Debugger for data-centric domain", IP.com No. IPCOM000226865D, Publication Date: Apr. 23, 2013, 14 pages.

Anonymously Disclosed "Cognitive, Self-Instrumenting Code on Detection of an Issue" IP.com No. IPCOM000253277D; Publication Date: Mar. 19, 2018; 4 pgs.

Anonymously Disclosed "Method and system to find potential program defect based on run-time variable change analysis", IP.com No. IPCOM000248699D, Publication Date: Dec. 28, 2016, 8 pages.

Anonymously Disclosed "Method for a debugging tool for finding variable value in application stack", IP.com No. IPCOM000209789D, Publication Date: Aug. 15, 2011, 5 pages.

Anonymously Disclosed "Method to enable debugger breakpoint inside statement", IP.com No. IPCOM000206941D, Publication Date: May 13, 2011, 8 pages.

Anonymously Disclosed "Simple Automated Code Coverage Method for test metrics", IP.com No. IPCOM000201864D, Publication Date: Nov. 29, 2010, 6 pages.

Anonymously Disclosed "Structured enhanced breakpoint chain", IP.com No. IPCOM000244264D, Publication Date: Nov. 27, 2015, 4 pages.

Anonymously Disclosed "System and method for improved regression failure analysis and easier debugging of test failures", IP.com No. IPCOM000209599D, Publication Date: Aug. 10, 2011, 6 pages.

Astigarraga, Tara "IBM Test Overview and Best Practices", IBM, Nov. 2012, pp. 1-53.

Cohen, D. M. et al., "The AETG system: An approach to testing based on combinatorial design." IEEE Transactions on Software Engineering, 23(7), pp. 437-444. Jul. 1997.

Compuware Corporation "Validate Testing Thoroughness and Provide Application Analysis", 2014, 4 pages.

De Souza et al., "Spectrum-based Software Fault Localization: A Survey of Techniques, Advances and Challenges" Dept. of Computer Science—University of Sao Paulo; arXiv:1607.04347v2 [cs.SE]; Nov. 26, 2017, 46 pages.

Devai, Gergely et al., "UML Model Execution via Code Generation" Eotvos Lorand University, Faculty of Informatics, Budapest, Hungary 2017, pp. 9-15.

Hicks et al., "Champion Test Case Generation", U.S. Appl. No. 16/256,949, filed Jan. 24, 2019.

Hicks et al., "Combinatoric Set Completion Through Unique Test Case Generation", U.S. Appl. No. 16/256,394, filed Jan. 24, 2019.

Hicks et al., "Fault Detection and Localization Using Combinatorial Test Design Techniques While Adhering to Archtiectural", U.S. Appl. No. 16/256,391, filed Jan. 24, 2019.

Hicks et al., "Reduction of Test Infrastructure", U.S. Appl. No. 16/440,781, filed Jun. 13, 2019.

Hicks et al., "Self Healing Software Utilizing Regression Test Fingerprints", U.S. Appl. No. 16/440,833, filed Jun. 13, 2019.

Hicks et al., "Test Space Analysis Across Multiple Combinatoric Models", U.S. Appl. No. 16/256,388, filed Jan. 24, 2019.

Hicks et al., "Associating Attribute Seeds of Regression Test Cases With Breakpoint Valuebased Fingerprints," U.S. Appl. No. 16/440,857, filed Jun. 13, 2019.

Hicks et al., "Breakpoint Value-Based Version Control," U.S. Appl. No. 16/440,800, filed Jun. 13, 2019.

Hicks et al., "Fault Detection and Localization to Generate Failing Test Cases Using Combinatorial Test Design Techniques", U.S. Appl. No. 16/256,388, filed Jan. 24, 2019.

Hicks et al., "Fault Detection Using Breakpoint Value-Based Fingerprints of Failing Degression Test Cases," U.S. Appl. No. 16/440,810, filed Jun. 13, 2019.

Hicks et al., "Regression Test Fingerprints Based on Breakpoint Values," U.S. Appl. No. 16/440,404, filed Jun. 13, 2019.

IBM "Assuring Software Quality by Automatic Generation of Test Cases and Automatic Analysis of Test Case Results for Derivation and Regression Error Determination" IP.com No. IPCOM000180300D; Publication Date: Mar. 6, 2009; 6 pgs.

IBM, "InspectioN Testing Using Debugging Capabilities To Allow Combinational Testing", IP.com No. IPCOM000188370D, Electronic Publication Date: Oct. 2, 2009, 3 pages.

IBM, "Tool and Strategy for testing and validating software components at the source code level", IP.com No. IPCOM000180330D, Publication Date: Mar. 6, 2009, 3 pages.

IBM, Method of preventing build failures by searching through levels in a multi-level revision control system IP.com No. IPCOM000179779D, Publication Date: Feb. 25, 2009, 3 pages.

Koch, Gernot et al., "Breakpoints and Breakpoint Detection in Source Level Emulation", Forschungszentrum Informatik (FZI), Haid-und-Neu-Strabe 10-14, D 76131 Karlsruhe, DE; University of Tübingen, Sand 13, D 72076 Tubingen, DE, 2017, 6 pages.

Kuhn, Rick "Introduction to Combinatorial Testing", NIST, Carnegie-Mellon University, Jun. 7, 2011, 48 pages.

Leon et al., "An empirical evaluation of test case filtering techniques based on exercising complex information flows," Proceedings of the 27th International Conference on Software Engineering, pp. 412-421. ACM, 2005.

Kamalakar, Sunil, "Automatically Generating Tests from Natural Language Descriptions of Software Behavior," Virginia Polytechic Institute and State University, Sep. 23, 2013. 72 pages.

List of IBM Patents or Patent Applications Treated as Related; Date Filed: Jul. 19, 2019, 2 pages.

Mathur et al., "Adaptive Automation: Leveraging Machine Learning to Support Uninterrupted Automated Testing of Software Applications" arXiv.org, Aug. 4, 2015. 6 pages.

Nguyen et al., "Combining model-based and combinatorial testing for effective test case generation," Proceedings of the 2012 International Symposium on Software Testing and Analysis, Jul. 15-20, 2012. pp. 100-110.

Petke, J. et al., "Efficiency and early fault detection with lower and higher strength combinatorial interaction testing". In Proceedings of the 2013 9th Joint Meeting on Foundations of Software Engineering, pp. 26-36. Aug. 18-26, 2013.

Segall "Combinatorial Test Design" IBM Haifa Research Labs, 2012, pp. 1-49.

Shakya, K. & Xie, T., "Isolating Failure-Inducing Combinations in Combinatorial Testing using Test Augmentation and Classification", CT 2012 workshop, (23 pages).

(56) References Cited

OTHER PUBLICATIONS

Sofa, Mary Lou et al. Exploiting Hardware Advances for Software Testing and Debugging (NIER Track) ICSE '11; May 21-28, 2011; 4 pgs.

Yilmaz et al., "Moving forward with combinatorial interaction testing," Computer, 47(2). Feb. 2014. pp. 37-45.

Andalib et al., "A Novel Key Generation Scheme for Biometric Cryptosystems Using Fingerprint Minutiae," IEEE, pp. 1-6 (Year: 2013).

Anonymous, "Combining Combinatorial Models while Maintaining Full Coverage," Jun. 25, 2016, 5 Pages.

Anonymous, "Explaining a Combinatorial Test Plan Using Hole Analysis" May 20, 2012; 4 pages.

Anonymous, "Integration of Combinatorial Testing Design with Automated Testing to Develop Smart Automated Test Suites," Jan. 6, 2015, 3 pages.

Anonymous, "Method and System for Optimizing Combinatorial Test Design (CTD) to Test a Mobile Application in Different Devices," Feb. 10, 2015, 2 pages.

Biswas, "Network-on-Chip Intellectual Property Protection Using Circular Path-based Fingerprinting," ACM, pp. 1-22 (Year: 2020).

Bromme et al., "A Conceptual Framework for Testing Biometric Algorithms within Operating Systems' Authentication", ACM, pp. 273-280 (Year: 2002).

Bryant et al., "Verification of Arithmetic Circuits with Binary Moment Diagrams," Proceedings of the 32nd ACM/IEEE design automation conference, 535-541, 1995.

Bures et al., "Tapir: Automation Support of Exploratory Testing Using Model Reconstruction of the System Under Test," IEEE, pp. 557-580 (Year: 2018).

Chakrabarti et al., "Specification Based Regression Testing Using Explicit State Space Enumeration," IEEE, pp. 1-6 (Year: 2006).

Chua, "Resistance switching memories are memristors," Applied Physics A, vol. 102, No. 4, 2011, pp. 765-783.

Esmaeili et al., "A Robust and Fast Video Copy Detection System Using Content-Based Fingerprinting," pp. 213-226 (Year: 2011).

Fang et al., "Identifying Test Refactoring Candidates with Assertion Fingerprints," ACM, pp. 125-137 (Year: 2015).

Fujita et al., "Multi-Terminal Binary Decision Diagrams: An Efficient Data Structure for Matrix Representation," Formal Methods in System Design—FMSD, vol. 10, No. 2/3, pp. 149-169, 1997.

Giugno et al., "GraphGrep: A Fast and Universal Method for Querying Graphs," IEEE, pp. 112-115 (Year: 2002).

Graves et al., "An empirical study of regression test selection techniques," ACM Trans. Softw. Eng. Methodol., 184-208 (2001).

Grindal et al., "Combination testing strategies: a survey," Softw. Test. Verif. Reliab. 15(3), 167-199 (2005).

Gu et al., "Multi-Aspect, Robust, and Memory Exclusive Guest OS Fingerprinting," IEEE, pp. 380-394 (Year: 2014).

Jain et al., "Fingerprint Matching," IEEE, pp. 36-44 (Year: 2010).

Kuhn, R., "Practical Applications of Combinatorial Testing," Mar. 2012.

Lehmann et al., "A Generic Systolic Array Building Block for Neural Networks with On-Chip Learning," IEEE Transactions on Neural Networks, vol. 4., No. 3, 1993, pp. 400-407.

Li et al., "Training itself: Mixed-signal training acceleration for memristor-based neural network," 19th Asia and South Pacific Design Automation Conference (ASP-DAC), 2014, pp. 361-366.

Maughan, C., "Test Case Generation Using Combinatorial Based Coverage for Rich Web Applications," 2012.

Memon, Atif M., and Qing Xie. "Studying the fault-detection effectiveness of GUI test cases for rapidly evolving software." IEEE transactions on software engineering 31.10 (2005): pp. 884-896. (Year: 2005).

Mishchenko, A., "An Introduction to Zero-Suppressed Binary Decision Diagrams," Proceedings of the 12th Symposium on the Integration of Symbolic Computation and Mechanized Reasoning, 2001.

Orso, A. et al., "Scaling regression testing to large software systems," ACM Bigsoft Software Engineering Notes 29.6 (2004); pp. 241-251. (Year: 2004).

Pershin et al., "Solving mazes with memristors: A massively parallel approach," Physical Review E, vol. 84, No. 4, 2011, 046703, 6 pages.

Ratha et al., "A Real-Time Matching System for Large Fingerprint Databases," IEEE, pp. 799-813 (Year: 1996).

Rothermel et al., "Analyzing Regression Test Selection Techniques", IEEE, pp. 529-551 (Year: 1996).

Shu et al., "Testing Security Properties of Protocol Implementations—a Machine Learning Based Approach," IEEE, pp. 1-8 (Year: 2007).

Snelick et al., "Multimodal Biometrics: Issues in Design and Testing," ACM, pp. 68-72 (Year: 2003).

Soudry et al., "Memristor-Based Multilayer Neural Networks With Online Gradient Descent Training," IEEE Transactions On Neural Networks and Learning Systems, 2015.

Taneja, Kunal, et al. "eXpress: guided path exploration for efficient regression test generation." Proceedings of the 2011 International Symposium on Software Testing and Analysis. 2011. pp. 1-11 (Year: 2011).

Trokielewicz, "Linear Regression Analysis of Template Aging in IRIS Biometrics," IEEE, pp. 1-6 (Year: 2015).

Tsai et al., "Adaptive-Scenario-Based Object-Oriented Test Frameworks for Testing Embedded Systems," IEEE, pp. 1-16 (Year: 2002).

Tsai et al., "Scenario-Based Object-Oriented Test Frameworks for Testing Distributed Systems," IEEE, pp. 1-7 (Year: 2000).

Wikipedia "All pairs testing" retrieved from https://web.archive.org/web/20180317245467https://en.wikipedia.org/wik/all-pairs_testing (Year: 2018).

Wikipedia "Cartesian Product" web page, from date Jan. 15, 2019, retrieved from https://web.archive.org/web/20190115231627/https://en.wikipedia.org/wiki/Cartesian_product (Year: 2019).

Wilmor, D. et al., "A safe regression test selection technique for database-driven applications." 21st IEEE International Conference on Software Maintenance (ICSM'05). IEEE, 2005, pp. 1-10 (Year: 2005).

Yan et al., "Regression From Uncertain Labels and Its Applications to Soft Biometrics," IEEE, pp. 698-708 (Year: 2008.

Yi, Q. et al., "A synergistic analysis method for explaining failed regression tests," 2015 IEEE/ACM 37th IEEE International Conference on Software Engineering. vol. 1. IEEE, 2015 pp. 257-267 (Year: 2015).

Zhong et al., "TestSage: Regression Test Selection for Large-scale Web Service Testing," IEEE, pp. 430-440 (Year: 2019).

Brumley et al., "Towards Automatic Discovery of Deviations in Binary Implementations with Applications to Error Detection and Fingerprint Generation," 16th USENIX Security Symposium, 2007, pp. 213-228.

Ghandehari et al., "Fault Localization Based on Failure-Inducing Combinations," IEEE 24th International Symposium on Software Reliability Engineering, 2013, pp. 168-177.

\* cited by examiner

CUSTOMIZABLE TEST SET SELECTION USING CODE FLOW TREES

RELATED APPLICATIONS

This application which claims the benefits of multiple legally related applications including Application titled "FAULT DETECTION AND LOCALIZATION TO GENERATE FAILING TEST CASES USING COMBINATORIAL TEST DESIGN TECHNIQUES" assigned Ser. No. 16/256,388, filed Jan. 24, 2019; Application titled "FAULT DETECTION AND LOCALIZATION USING COMBINATORIAL TEST DESIGN TECHNIQUES WHILE ADHERING TO ARCHITECTURAL RESTRICTIONS" assigned Ser. No. 16/256,391, filed Jan. 24, 2019; Application titled "COMBINATORIC SET COMPLETION THROUGH UNIQUE TEST CASE GENERATION" assigned Ser. No. 16/256,394, filed Jan. 24, 2019; Application titled "TEST SPACE ANALYSIS ACROSS MULTIPLE COMBINATORIC MODELS" assigned Ser. No. 16/256,179, filed Jan. 24, 2019; Application titled "CHAMPION TESTCASE GENERATION" assigned Ser. No. 16/256,949, filed Jan. 24, 2019; Application titled "REGRESSION TEST FINGERPRINTS BASED ON BREAKPOINT VALUES," assigned Ser. No. 16/440,404, filed Jun. 13, 2019; Application titled "SELF HEALING SOFTWARE UTILIZING REGRESSION TEST FINGERPRINTS," Ser. No. 16/440,883, not yet filed; Application titled "REDUCTION OF TEST INFRASTRUCTURE,", not yet filed; Application titled "BREAKPOINT VALUE-BASED VERSION CONTROL," Ser. No. 16/440,800, not yet filed; Application titled "FAULT DETECTION USING BREAKPOINT VALUE-BASED FINGERPRINTS OF FAILING REGRESSION TEST CASES," Ser. No. 16/440,810, not yet filed; and Application titled "ASSOCIATING ATTRIBUTE SEEDS OF REGRESSION TEST CASES WITH BREAKPOINT VALUE-BASED FINGERPRINTS," Ser. No. 16/440,857, not yet filed, with all the benefits accruing therefrom, the contents of which in its entirety are herein incorporated by reference.

BACKGROUND

The present invention relates to testing of a computer program and, more specifically, customizable test set selection via mapping mathematical correlations between code flow trees and combinatorial test coverage models.

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous.

Coverage tools for checking software provide a measure of how well the software being evaluated has been exercised during testing and thereby give a level of assurance that the software is of high quality. There are a number of types of coverage known in the art, such as statement coverage, line coverage, condition coverage, path coverage, method coverage, and the like. One additional coverage method is functional coverage. Functional coverage is designed to measure amount, portion or a similar metric of tests that examined predetermined functional behaviors. Once functional coverage is measured, quality assurance (QA) personnel may design additional tests to examine untested behaviors.

However, it is challenging to represent the functional coverage test-space, which potentially contains a substantially large number of potential coverage tasks. One technical solution is to utilize a code flow tree to symbolically represent the functional coverage test-space. Symbolic representation is much more scalable than an explicit representation of the test-space and may be useful in representing large sets of data.

Test selection is a technique for reducing the testing effort by selecting a subset of the existing tests to run, while preserving a level of confidence in the coverage of the selected tests. What is needed is a method enabling efficient test selection based on mathematical correlations between code flow trees and combinatorial test coverage models.

SUMMARY

Embodiments of the present invention are directed to a computer-implemented method for identifying optimal tests. A non-limiting example of the computer-implemented method includes defining functional coverage by a test suite based on a functional coverage model of a System Under Test (SUT). The test suite includes a plurality of tests. The functional coverage model includes a plurality of attributes. Each of the plurality of attributes has a set of possible values. The functional coverage model defines possible combinations of values of the attributes as covered by the test suite. A subset of the possible combinations of values is determined. The subset is characterized in covering substantially all pairwise combinations of the possible combinations. A subset of the plurality of tests is selected. The selected subset of the plurality of tests is operative to cover the determined subset of the possible combinations of values. A plurality of trees is generated that includes a plurality of code flow trees to represent the selected subset of the plurality of tests. The complexity of the generated plurality of trees is analyzed based on user-specified criteria. An optimal tree is selected from the subset of the plurality of trees to achieve the objective of the test suite based on the analyzed complexity of the generated plurality of trees.

Embodiments of the present invention are directed to a system for identifying optimal tests. A non-limiting example of the system includes a memory having computer-readable instructions and one or more processors for executing the computer-readable instructions. The computer-readable instructions include instructions for defining functional coverage by a test suite based on a functional coverage model of a System Under Test (SUT). The test suite includes a plurality of tests. The functional coverage model includes a plurality of attributes. Each of the plurality of attributes has a set of possible values. The functional coverage model defines possible combinations of values of the attributes as covered by the test suite. A subset of the possible combinations of values is determined. The subset is characterized in covering substantially all pairwise combinations of the possible combinations. A subset of the plurality of tests is selected. The selected subset of the plurality of tests is operative to cover the determined subset of the possible combinations of values. A plurality of trees is generated that includes a plurality of code flow trees to represent the selected subset of the plurality of tests. The complexity of the generated plurality of trees is analyzed based on user-specified criteria. An optimal tree is selected from the subset of the plurality of trees to achieve the objective of the test suite based on the analyzed complexity of the generated plurality of trees.

Embodiments of the invention are directed to a computer-program product for identifying optimal tests, the computer-program product including a computer-readable storage medium having program instructions embodied therewith. The program instructions are executable by a processor to cause the processor to perform a method. A non-limiting example of the method includes defining functional coverage by a test suite based on a functional coverage model of a System Under Test (SUT). The test suite includes a plurality of tests. The functional coverage model includes a plurality of attributes. Each of the plurality of attributes has a set of possible values. The functional coverage model defines possible combinations of values of the attributes as covered by the test suite. A subset of the possible combinations of values is determined. The subset is characterized in covering substantially all pairwise combinations of the possible combinations. A subset of the plurality of tests is selected. The selected subset of the plurality of tests is operative to cover the of the possible combinations of values. A plurality of trees is generated that includes a plurality of code flow trees to represent the selected subset of the plurality of tests. The complexity of the generated plurality of trees is analyzed based on user-specified criteria. An optimal tree is selected from the subset of the plurality of trees to achieve the objective of the test suite based on the analyzed complexity of the generated plurality of trees.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
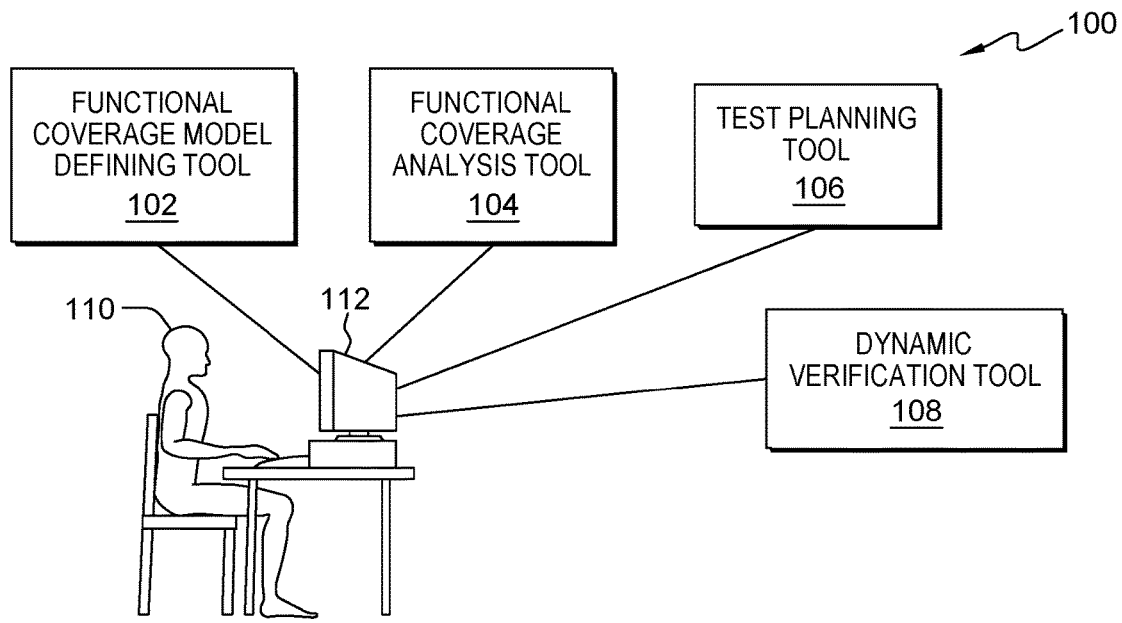
FIG. 1 shows a schematic illustration of a computerized environment, in accordance with embodiments of the present invention.

The diagrams depicted herein are illustrative. There can be many variations to the diagrams or the operations described therein without departing from the spirit of the invention. For instance, the actions can be performed in a differing order or actions can be added, deleted or modified.

Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Functional coverage is measured with respect to a functional coverage model. The functional coverage model defines a triplet: functional attributes, a domain for each functional attribute, and a set of restrictions. The functional attributes may be any attribute of the SUT, such as for example a type of web browser being used, an underlying Operating System, a number of threads operating, whether the output was printed. The domains may define for each attribute a set of possible values. The test-space comprises a set of coverage tasks, each representing functional requirements to be tested: one requirement per functional attribute and the requirement is that the functional attribute will exhibit the behavior of the value of the coverage task. The coverage task may be seen as a tuple of one value per attribute. In a functional coverage model in which there are three functional attributes, one having three possible values, the second having two possible values, and the third having ten possible values, the test-space comprises sixty (60) coverage tasks.

Embodiments of the present invention utilize code flow trees to symbolically represent the functional coverage test-space. Symbolic representation is much more scalable than an explicit representation of the test-space and may be useful in representing large sets of data.

Furthermore, embodiments of the present invention enable test planning based on the code flow tree representation of the functional coverage test-space. In some exemplary embodiments, test planning may be performed by utilizing Combinatorial Test Design (CTD). CTD may be performed with respect to an interaction requirement, such as a pair-wise interaction or n-tuple interaction. The test plan may provide for sufficient coverage tasks that would assure that the interaction requirement is fulfilled. In some exemplary embodiments, the CTD may be performed by manipulating a plurality of code flow trees, each associated with a different tuple of functional attributes, as is further explained hereinbelow. In some exemplary embodiments, CTD may be performed with respect to a set of interaction requirements.

In some exemplary embodiments, test planning is based on a modeling of the test space using a functional coverage model. The test space can represent inputs, scenarios, configurations, the application's internal state, or any other aspect that might need to be tested. The functional coverage model may include a set of functional attributes, a respective domain of possible values for each functional attribute, and restrictions on the value combinations.

With respect to test planning, a test-space may define potential tests that may be executed on the SUT. A test can be associated with exactly one potential test, as opposed to coverage tasks. In some exemplary embodiments, several different tests may hold the same potential test.

In some exemplary embodiments, the motivation for the approach of CTD is that most bugs depend on the interaction between a small number of functional attributes. CTD algorithms may also deal with the scalability issues. The CTD algorithms may assume that the combinations space is too large to be represented explicitly, and they use various techniques to try to generate an optimized test plan without explicitly enumerating all possible combinations. Examples of such algorithms may be a reduction to the orthogonal arrays or covering arrays problems. Those techniques are limited in the type of restrictions they allow on the value combinations, or in the type of requested interaction level, and still hit scalability issues as the number of model variables increases.

Thus, there is a need to provide a mechanism to represent efficiently large test-spaces and enable performing operations thereof, in a more scalable manner. In some exemplary embodiments, a symbolic representation of the functional coverage model may be utilized. The symbolic representation may use a code flow tree. A code flow tree is an example data structure for representing of a source code path traversed during execution of a corresponding program. Each node in a code flow tree represents a section of source code that was traversed during program execution. In one embodiment, a code flow tree may be represented by a BDD. A BDD is a relatively compact data structure for representing and manipulating Boolean functions. By representing a Boolean function that is associated with whether or not the combination of functional attributes is a member of the functional coverage test-space, the BDD may be utilized to represent the test-space. Thus, the Boolean function is seen as answering the question: is this a valid coverage task in accordance with the functional coverage model?

Referring now to FIG. 1, showing a schematic illustration of a computerized environment, in accordance with embodiments of the present invention. A computerized environment 100 may comprise one or more computerized tools.

In some exemplary embodiments, a user 110, such as a developer, a QA staff member, a tester, a designer, a verification engineer or the like, may interact with the computerized environment 100. The user 110 may utilize a Man-Machine Interface (MMI) 112 such as a terminal, a display, a keyboard, an input device or the like.

In some exemplary embodiments, a functional coverage model defining tool 102 may be utilized to define the functional coverage model. In some exemplary embodiments, the user 110 may define the functional attributes, domains, and restrictions. In some exemplary embodiments, a similar tool may be utilized to define a test-space. In some exemplary embodiments, the functional coverage model may be adapted to be utilized as a test model.

In some exemplary embodiments, a dynamic verification tool 108 may be utilized to test the SUT. It will be noted that the SUT may be hardware, firmware, software, combination thereof or any other type of computerized device. The dynamic verification tool 108 may be a simulation-based verification tool, a test-generation platform, or the like. The dynamic verification tool 108 may be operatively coupled to a test planning tool 106 and configured to perform testing in accordance with the test plan. In some exemplary embodiments, the test planning tool 106 may provide the tests for the dynamic verification tool 108 to perform. It will be noted that dynamic verification is a broader concept than testing the SUT, and it further includes test planning, coverage analysis and the like. The dynamic verification tool 108 provides only one aspect of the entire scope of operations that may be performed during dynamic verification and should not be used to construe the term "dynamic verification" narrowly.

In some exemplary embodiments, a functional coverage analysis tool 104 may be configured to measure functional coverage based on the dynamic verification performed by the dynamic verification tool 108. The functional coverage analysis tool 104 may provide a coverage measurement, such as a portion of the coverage test-space or of the defined test plan, indicative of coverage tasks that were covered during dynamic verification performed by the dynamic verification tool 108. The user 110 may review the coverage measurement and/or the list of covered tasks.

In some exemplary embodiments, a test planning tool 106 may define a test plan to be covered. In some exemplary embodiments, the test plan may be a set of coverage tasks to be covered, thereby providing a subset of the test space to be tested instead of the entire test-space. In some exemplary embodiments, the test plan tool 106 may provide tests that are likely to cover the test plan, such as based on a test benchmark stored in a datastore (not shown) which comprises tests that are known/estimated to cover specific functional aspects. As another example, the test plan tool 106 may be configured to generate tests so as to cover coverage tasks. The user 110 may review the test plan, the selected test or the like. In some exemplary embodiments, the user 110 may provide parameters for the test planning tool 106 to use in determining the objective of the test plan, such as a desired interaction level.

While the example system in FIG. 1 has been described with specific components including the functional coverage model defining tool 102, functional coverage analysis tool 104, test planning tool 106 and the dynamic verification tool 108, embodiments are not limited to these components or system configurations and can be implemented with other system configuration employing fewer or additional components.

Figure 2A:
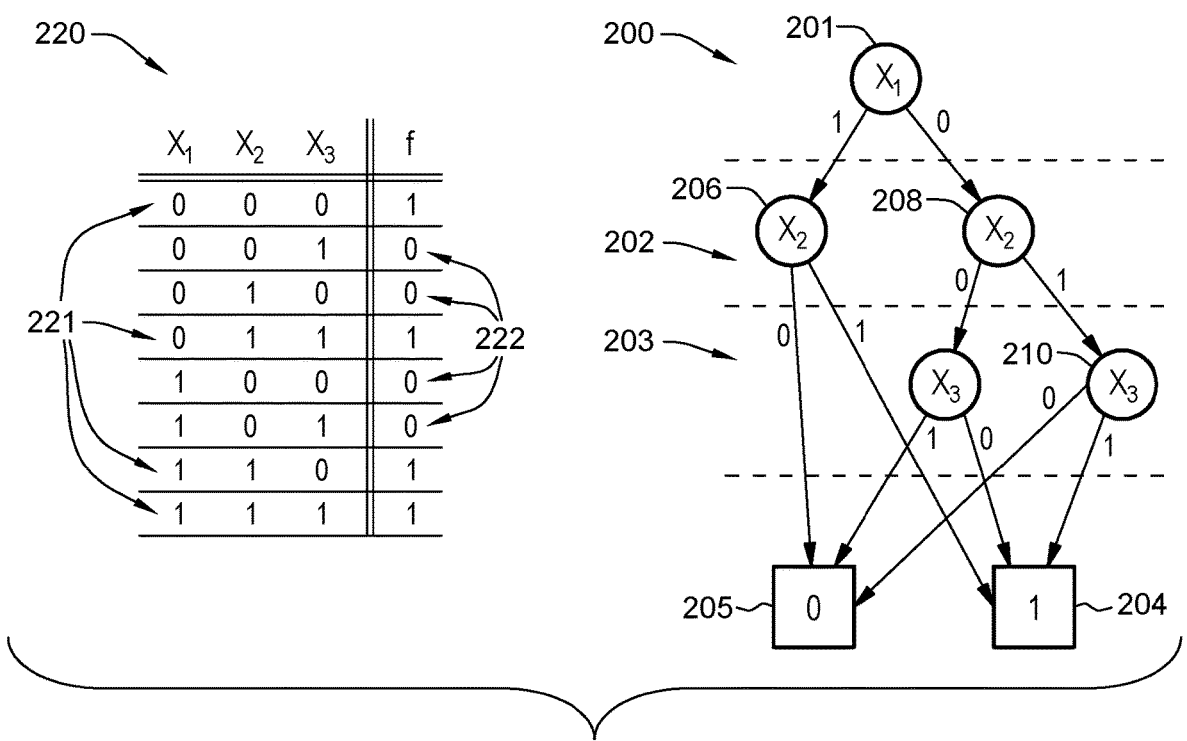
FIG. 2A illustrates an exemplary code flow tree in a form of a Binary Decision Diagram (BDD), in accordance with embodiments of the present invention.
Figure 2B:
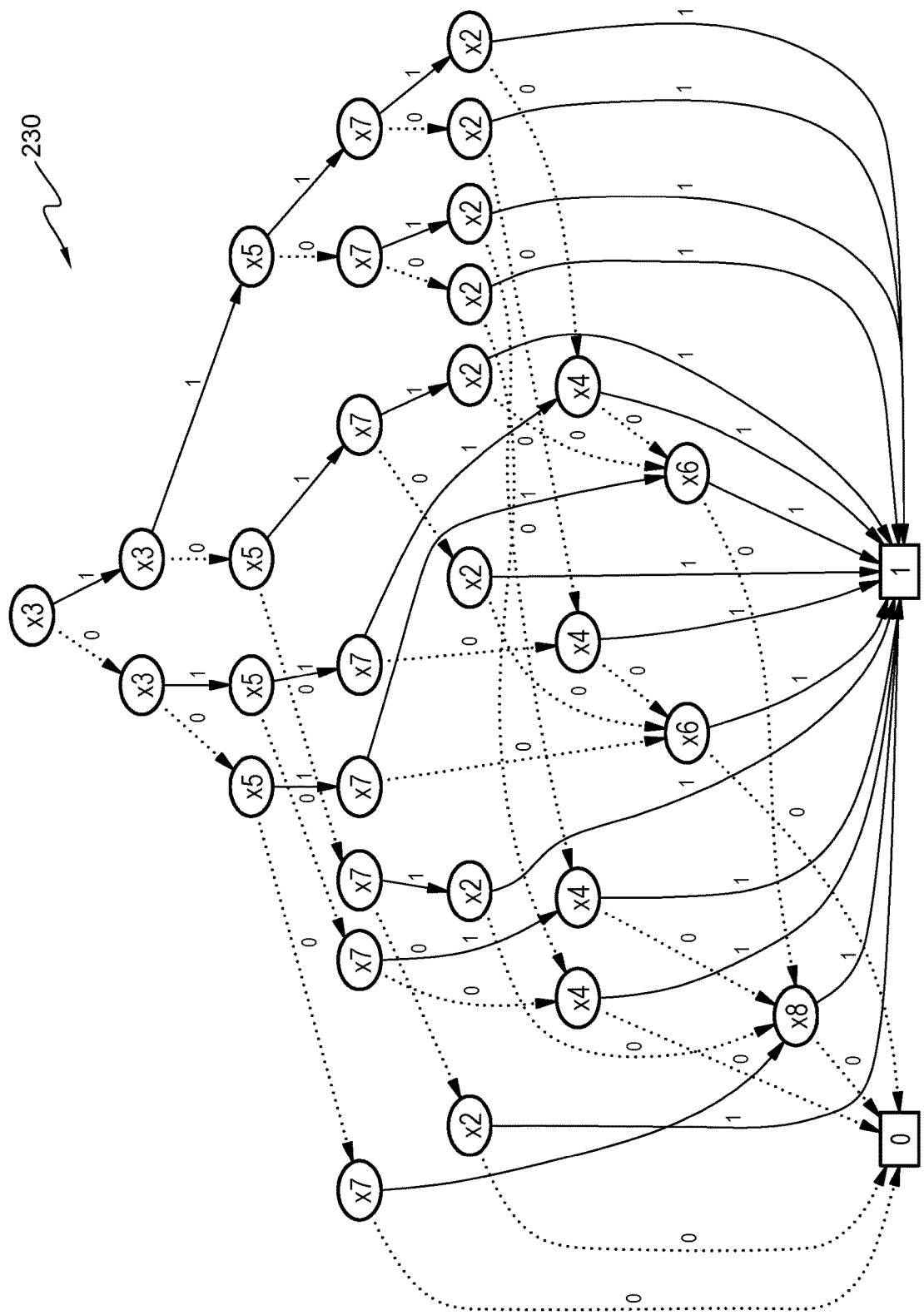
FIG. 2B shows another example of a BDD, in accordance with embodiments of the present invention.
Figure 2C:
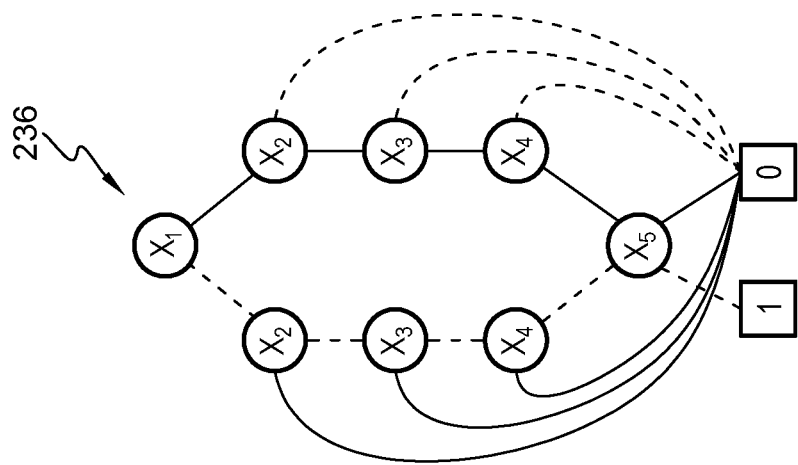
FIG. 2C illustrates an example of performing conjunction of two BDDs, in accordance with embodiments of the present invention.
Figure 2C:
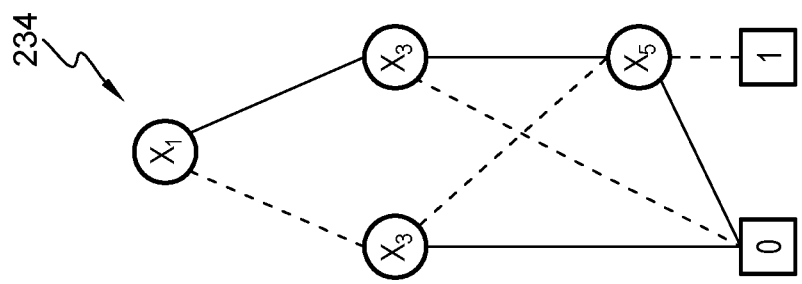
Figure 2C:
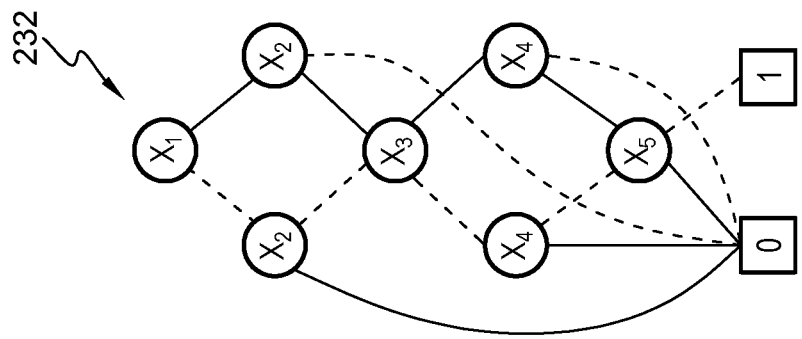

Referring now to FIGS. 2A-2C showing illustrations of code flow trees in a form of BDDs, in accordance with embodiments of the present invention. Starting with the FIG. 2A, a BDD 200 for the binary function $(x_1 \hat{} x_2) \vee (x_2 \hat{} x_3) \vee (\neg x_1 \hat{} \neg x_2 \hat{} \neg x_3)$ is a compact data structure that provides for an assignment to the binary variables $x_1$, $x_2$, $x_3$ whether the binary function is evaluated to true (1) or false (0). The classical calculus for dealing with truth values consists of Boolean variables x,y, . . . the constants true 1 and false 0, the operators of conjunction $\hat{}$, disjunction $\vee$, negation $\neg$, implication $\Rightarrow$, and bi-implication $\Leftrightarrow$ which together form the Boolean expressions. The BDD variables are binary variables. However, functional attributes that are not binary may be encoded using two or more BDD variables. For example, the variables $x_1$ and $x_3$ may be associated with a single functional attribute having a domain of three or four alternative values.

In some exemplary embodiments, the BDD 200 is a Directed Acyclic Graph (DAG), which consists of decision nodes and two terminal nodes 204, 205. Each decision node is labeled by a BDD variable and has two child nodes. The edge from a node to a child node represents an assignment of the variable to 0 or 1. The BDD 200 is ordered as different variables appear in the same order on all paths from the root. In some exemplary embodiments, the BDD may merge isomorphic sub-graphs and may exclude nodes whose children are isomorphic. Thus, the BDD is a compact version of a Binary Decision Tree from the same function.

A path from the root node 201 to the 1-terminal 204 represents a (possibly partial) variable assignment for which the represented Boolean function is true. As the path descends to a child from a node, then that node's variable is assigned a corresponding value.

BDD 200 orders the BDD variables, the root node, node 201, is associated with $x_1$. Based on the value of $x_1$, a sub-graph beginning in the second level 202 is selected (either node 206 or node 208). The second level 202 is associated with $x_2$. Based on the value of $x_2$, a sub-graph beginning in the third level 203 is selected. The third level 203 is associated with $X_3$.

If at any time, the value of the function is constant and no additional information is needed, the BDD skips the next levels to the relevant constant value: one (terminal node 204) or zero (terminal node 205). For example, if $x_1$ is true (1) and $x_2$ is false (0), then no matter what the value of $x_3$ is, the function is evaluated to zero.

The order of the BDD variables may affect its size. Generally speaking, the variables which are most useful to determine the constant value should be placed in high levels of the BDD (near the root) so as to allow the evaluation to be performed with as few edges as possible.

Referring to a truth table 220 of the same function of the BDD 200, rows 221 are rows for which the function is evaluated to true (1) and rows 222 are rows for which the function is evaluated to false (2). The BDD 200 provides the same information as the truth table 220 using a symbolic representation.

It will be noted that the BDD 200 may be used directly to perform calculations. For example, universal quantification of a variable may be performed, as well as existential quantification. Furthermore, Boolean operations, such as conjunction and disjunction, between functions may be performed directly using their BDDs.

It will be further noted that as used herein the term "Binary Decision Diagrams (BDDs)" may refer to BDDs and variations thereof, such as for example Zero-suppressed Decision Diagrams (ZDDs), Multi-Terminal Decisional Diagrams (MTDDs), Multi-Valued Decision Diagram (MDDs), and Binary Moment Diagrams (BMD)s.

Generally, ZDDs are a version of BDDs where instead of introducing a node in the diagram when the result of the function is different between the 'true' and 'false' assignments to the corresponding variable, a node is introduced when the 'false' assignment to the corresponding variable results in evaluating the function to anything different than the constant 'false'. ZDDs are disclosed in A. Mishchenko, "An Introduction to Zero-Suppressed Binary Decision Diagrams", Proceedings of the 12th Symposium on the Integration of Symbolic Computation and Mechanized Reasoning, 2001, which is hereby incorporated by reference.

Generally, MTDDs are an extension of BDDs where the function can evaluate to more than two values, i.e., have multiple terminal nodes. MTDDs are disclosed in M. Fujita et al., "Multi-Terminal Binary Decision Diagrams: An Efficient Data Structure for Matrix Representation", Formal Methods in System Design—FMSD, vol. 10, no. 2/3, pp. 149-169, 1997, which is hereby incorporated by reference Generally, BMDs are a generalization of BDDs to include also domains over integers and real numbers. BMDs are disclosed in R. E. Bryant et al., "Verification of Arithmetic Circuits with Binary Moment Diagrams", Proceedings of the 32nd ACM/IEEE design automation conference, 535-541, 1995, which is hereby incorporated by reference.

FIG. 2B shows another example of a BDD, in accordance with embodiments of the present invention. The BDD 230 represents the function $f(x_1, \ldots, x_8) = x_1 x_2 + x_3 x_4 + x_5 x_6 + x_7 x_8$ using bad variable ordering. As noted above, the order of the BDD variables may affect its size. In this example, bad ordering of variables added some complexity to the BDD 230. In other words, the size of the BDD is determined both by the function being represented and the chosen ordering of the variables. Thus, the order of variables may have a direct effect on the complexity of BDDs.

It should be noted that BDDs can be manipulated by applying a variety of operations. FIG. 2C illustrates an example of performing conjunction of two BDDs, in accordance with some exemplary embodiments of the present invention. More specifically, the BDD 236 is a result of the conjunction of the BDD 232 and the BDD 234.

In the context of software testing, code flow trees such as BDDs 230-236 represent subsets of test cases from a test suite. In other words, different code flow trees represents different paths through a code of the SUT. Generally, code flow trees can be helpful in identifying optimal tests to run. However, in various embodiments, code flow trees of several types and varying degrees of complexity may be generated. Thus, finding an optimal code flow tree to meet a user's testing objective usually is not a trivial task.

Embodiments of the present invention enable selection of an optimal BDD from a plurality of BDDs to achieve the objective of a test suite. One of ordinary skill will realize that other embodiments might not utilize BDDs, but instead use any other method of reducing test space using graphical representation either now known or later developed.

Figure 3:
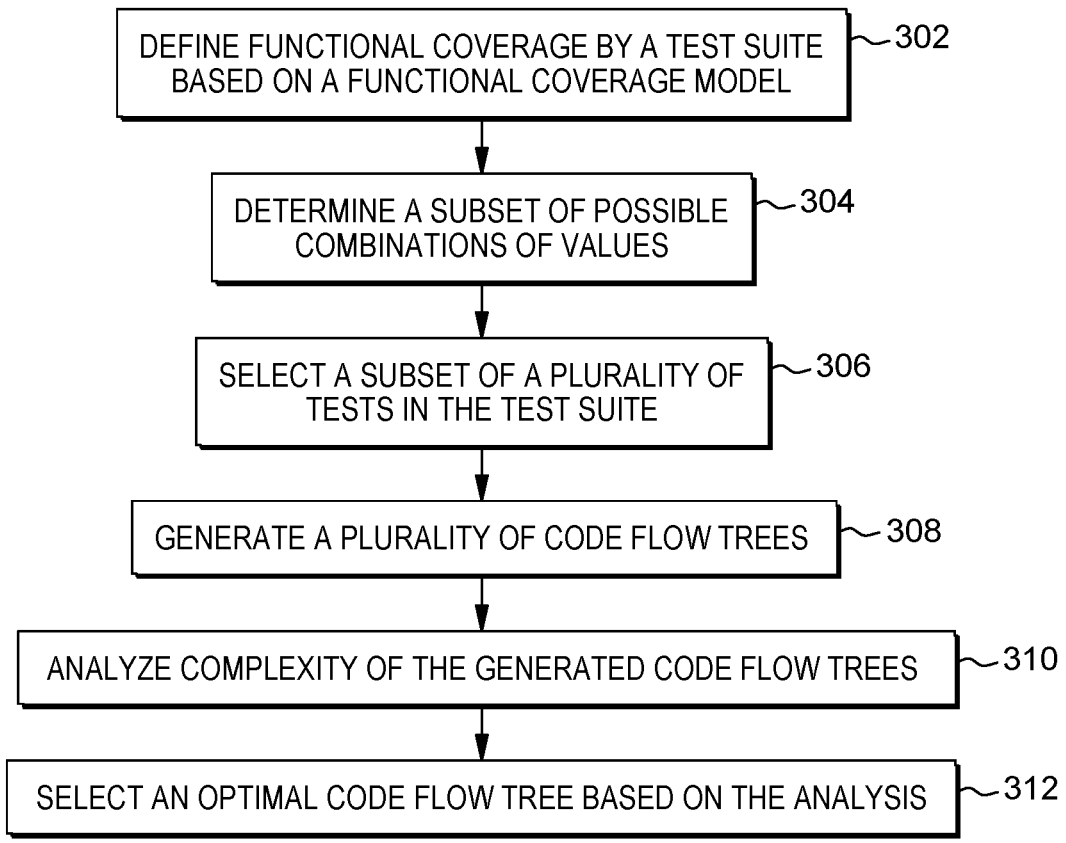
FIG. 3 shows a flowchart of a method for identifying optimal tests, in accordance with embodiments of the present invention.

FIG. 3 shows a flowchart of a method for identifying optimal tests, in accordance with embodiments of the present invention. A test space may be defined using attributes and their values. At block 302, the functional coverage model defining tool 102 defines functional coverage by a test suite based on a functional coverage model. The test suite includes a plurality of tests. The test suite may be reused to revalidate that the SUT exhibits a desired functionality with respect to the tests of the test suite. For example, the test suite may be reused to check that SUT works properly after a bug is fixed. The test suite may be used to check that the bug is indeed fixed (with respect to a test that previously induced the erroneous behavior). Additionally, or alternatively, the test suite may be used to check that no new bugs were introduced (with respect to other tests of the tests suite that should not be affected by the bug fix). A functional coverage model defines coverage tasks of the SUT as a plurality of tuples, wherein each tuple represents a combination of possible values of different attributes. The test space of the SUT is defined based on attributes, each having a set of possible values. The functional coverage model defines a portion of the complete Cartesian product of values of attributes. The portion may be defined using exclusion rules, a second attribute, using inclusion rules (e.g., a certain combination of values of attributes is valid), explicitly (by defining the set of possible valid combinations), using a combination thereof or the like.

An n-wise coverage combination metric is a number, portion or a similar empirical value, representing how many of the n-wise combinations of the state space defined by the functional coverage model is required to be covered. In some exemplary embodiments, a pair-wise requirement may be that 100% of all two valid combinations of values of any two attributes are covered. In some exemplary embodiments, a different measurement, lower than 100%, may be required to be covered. Additionally, or alternatively, the n-wise requirement may be measured with respect to a pair-wise coverage, a three-wise coverage, a four-wise coverage, or the like.

The n-wise coverage combination metric is considered useful as statistics show that most bugs depend on the interaction between the values of a small number of parameters in order to have their effect appear (n-wise interaction). The entire test space defined by the functional coverage model is usually much larger than a test space in which 100% of all pairs, triplets, quadruplets, or the like are required to be covered. Therefore, a significantly smaller number of tests may be used, and it is likely to find most, if not all, of the bugs in the SUT. It will be noted that the disclosed embodiments are not dependent on the above-mentioned premise and may be useful even in the case that the premise is not applicable.

In one embodiment, a functional coverage model defines the test space that is covered by the test suite. Based on this functional coverage model which corresponds to a portion of valid combinations (and therefore valid potential tests), a test selection may be performed. The test selection may be performed so as to maintain the current n-wise requirement with respect to the valid test space.

The test selection may be performed by selecting a subset of the tests that would maintain 100% n-wise coverage with respect to the tested test space, and therefore maintaining the n-wise coverage metric with respect to the valid test space. In some exemplary embodiments, at block 304, the functional coverage analysis tool 104 may be operative to determine a subset of the possible combinations of values. The subset of the possible combinations of values is with respect to the covered test space defined by the functional coverage model determined by the functional coverage model defining tool 102. The subset may be characterized in covering substantially all (100%) n-wise combinations of the possible combinations. In some exemplary embodiments, the n-wise combinations coverage requirement may comprise a plurality of different requirements with respect to different sets of attributes. The n-wise requirement may be obtained from the user 110.

At block 306, the test planning tool 106 selects a subset of the plurality of tests in the test suite. Test selection is a technique for reducing the testing effort by selecting a subset of the existing tests to run, while preserving a level of confidence in the coverage of the selected tests (see Graves, T. L., Harrold, M., Kim, J.-M., Porter, A., Rothermel, G. An empirical study of regression test selection techniques. ACM Trans. Softw. Eng. Methodol., 184-208 (2001)). The most common criterion for test selection is code coverage, i.e., select a subset of the tests that cover the same code as the original set of tests, or cover code that has recently changed.

In one embodiment, the test planning tool 106 may utilize CTD to determine a set of sufficient tests. Instead of using the CTD method for test planning, the disclosed embodiment utilizes the CTD method for test selection. A CTD tool is given a description of a test space in the form of variables, their respective values, and possibly restrictions on the values combinations. In some exemplary embodiments, the CTD tool may be provided with a functional coverage model defining the possible test space. CTD may select a subset of the possible tests that ensures coverage of all valid combinations of every two attributes (or every three, or four, etc.). Many tools and algorithms exist for CTD as is disclosed in Grindal, M., Offutt, J., Andler, S. F. "Combination testing strategies: a survey". Softw. Test, Verif. Reliab 15(3), 167-199 (2005), and the disclosed embodiment may utilize any of one of them. The CTD may be utilized with respect to the covered test space so as to determine whether a reduced number of tests would still achieve 100% n-wise coverage of the covered test space.

In some exemplary embodiments, if 100% n-wise coverage is required at test selection phase, while using existing tests as much as possible, this can be achieved by first selecting a subset of the existing tests according to the n-wise coverage criterion, and then generating (using CTD) a complement set of test cases that covers the n-tuples that are not covered by the existing test cases.

In some exemplary embodiments, a symbolic representation of the functional coverage model may be utilized. The symbolic representation may use a code flow tree, such as a BDD. A BDD is a relatively compact data structure for representing and manipulating Boolean functions. By representing a Boolean function that is associated with whether or not the combination of functional attributes is a member of the functional coverage test-space, the BDD may be utilized to represent the test-space. Thus, the Boolean function is seen as answering the question: is this a valid coverage task in accordance with the functional coverage model?

According to an embodiment of the present invention, at block 308, a code flow tree generator 410 (shown in FIG. 4) generates a plurality of code flow trees (e.g., BDDs) to represent the selected subset of the plurality of tests. Instead of representing the set of valid combinations explicitly, a BDD may be built using the restrictions. The BDD evaluates to "true" exactly the set of assignments that represent valid value combinations. In this way, the size of the test-space is likely to be significantly reduced, since the worst case is the explicit representation as a truth table representation, and BDDs are usually much smaller than the worst case. In one embodiment, multi-valued domains may be encoded using a number (n) of bits. The n bits may be encoded to n BDD variables such that the non-binary functional attribute is encoded using binary variables and therefore can be manipulated using BDDs. Each value of the domain may be encoded to different binary value using the n bits. In some exemplary embodiments, a multi-valued decision tree may be used to translate the n bits to the corresponding value of the domain. Other mapping methods may be used, such as for example, a dictionary data structure. In one embodiment, a separate BDD tree is generated to model the coverage for each test in the subset selected at block 306. Additionally, or alternatively, any other code flow tree may be used to represent the model of the coverage instead of other variations of the BDD data structure.

At block 310, a code flow tree analyzing module 412 (shown in FIG. 4) analyzes the complexity of the generated code flow trees. In this context, the code flow tree analyzing module 412 may utilize a variety of techniques including, without limitation, data mining techniques, statistical analysis techniques, predictive analysis techniques, data modeling techniques, machine-learning algorithms, and/or the like. The phrase "machine learning" broadly describes a function of electronic systems that learn from data. A machine learning model, engine, or module can include a trainable machine learning algorithm that can be trained, such as in an external cloud environment, to learn functional relationships between inputs and outputs that are currently unknown.

The code flow tree analyzing module 412 may employ quite many different types of machine learning algorithms including implementations of a classification algorithm, a neural network algorithm, a regression algorithm, a decision tree algorithm, a clustering algorithm, a genetic algorithm, a supervised learning algorithm, a semi-supervised learning algorithm, an unsupervised learning algorithm, a deep learning algorithm, or other types of algorithms. More specifically, machine learning algorithms can include implementations of one or more of the following algorithms: a support vector machine, a decision tree, a nearest neighbor algorithm, a random forest, a ridge regression, a Lasso algorithm, a k-means clustering algorithm, a boosting algorithm, a spectral clustering algorithm, a mean shift clustering algorithm, a non-negative matrix factorization algorithm, an elastic net algorithm, a Bayesian classifier algorithm, a RANSAC algorithm, an orthogonal matching pursuit algorithm, bootstrap aggregating, temporal difference learning, backpropagation, online machine learning, Q-learning, stochastic gradient descent, least squares regression, logistic regression, ordinary least squares regression (OLSR), linear regression, stepwise regression, multivariate adaptive regression splines (MARS), locally estimated scatterplot smoothing (LOESS) ensemble methods, clustering algorithms, centroid based algorithms, principal component analysis (PCA), singular value decomposition, independent component analysis, k nearest neighbors (kNN), learning vector quantization (LVQ), self-organizing map (SOM), locally weighted learning (LWL), apriori algorithms, eclat algorithms, regularization algorithms, ridge regression, least absolute shrinkage and selection operator (LASSO), elastic net, classification and regression tree (CART), iterative dichotomiser 3 (ID3), C4.5 and C5.0, chi-squared automatic interaction detection (CHAD), decision stump, M5, conditional decision trees, least-angle regression (LARS), naive bayes, gaussian naive bayes, multinomial naive bayes, averaged one-dependence estimators (AODE), bayesian belief network (BBN), bayesian network (BN), k-medians, expectation maximization (EM), hierarchical clustering, perceptron back-propagation, hopfield network, radial basis function network (RBFN), deep boltzmann machine (DBM), deep belief networks (DBN), convolutional neural network (CNN), stacked auto-encoders, principal component regression (PCR), partial least squares regression (PLSR), sammon mapping, multidimensional scaling (MDS), projection pursuit, linear discriminant analysis (LDA), mixture discriminant analysis (MDA), quadratic discriminant analysis (QDA), flexible discriminant analysis (FDA), bootstrapped aggregation (bagging), adaboost, stacked generalization (blending), gradient boosting machines (GBM), gradient boosted regression trees (GBRT), random forest, or even algorithms yet to be invented. Training may be supervised, semi-supervised, or unsupervised. Once trained, the trained machine learning model of interest represents what has been learned or rather the knowledge gained from analyzing a plurality of code flow trees. The trained model can be considered a passive model or an active model. A passive model represents the final, completed model on which no further work is performed. An active model represents a model that is dynamic and can be updated based on various circumstances. In some embodiments, the trained model is updated in real-time, on a daily, weekly, bimonthly, monthly, quarterly, or annual basis. As new information is made available (e.g., new BDDs are generated, etc.), an active model will be further updated. In such cases, the active model carries metadata that describes the state of the model with respect to its updates. In various embodiments, the code flow tree analyzing module 412 may analyze BDD topology information to identify one or more patterns, for example. Analyzed topology information may include, but is not limited to, shape, depth, breadth, total number of edges, total number of nodes associated with each of the plurality of code flow trees, and the like. In an alternative embodiment, the code flow tree analyzing module 412 may employ a vector analysis model.

At block 312, the code flow tree analyzing module 412 selects an optimal code flow tree based on the analysis performed at block 310. More specifically, the code flow tree analyzing module 412 selects an optimal tree to achieve the objective of the test suite based on the analyzed complexity of the generated plurality of code flow trees. In one embodiment, the objective of the test suite may be provided by the user 110.

Figure 4:
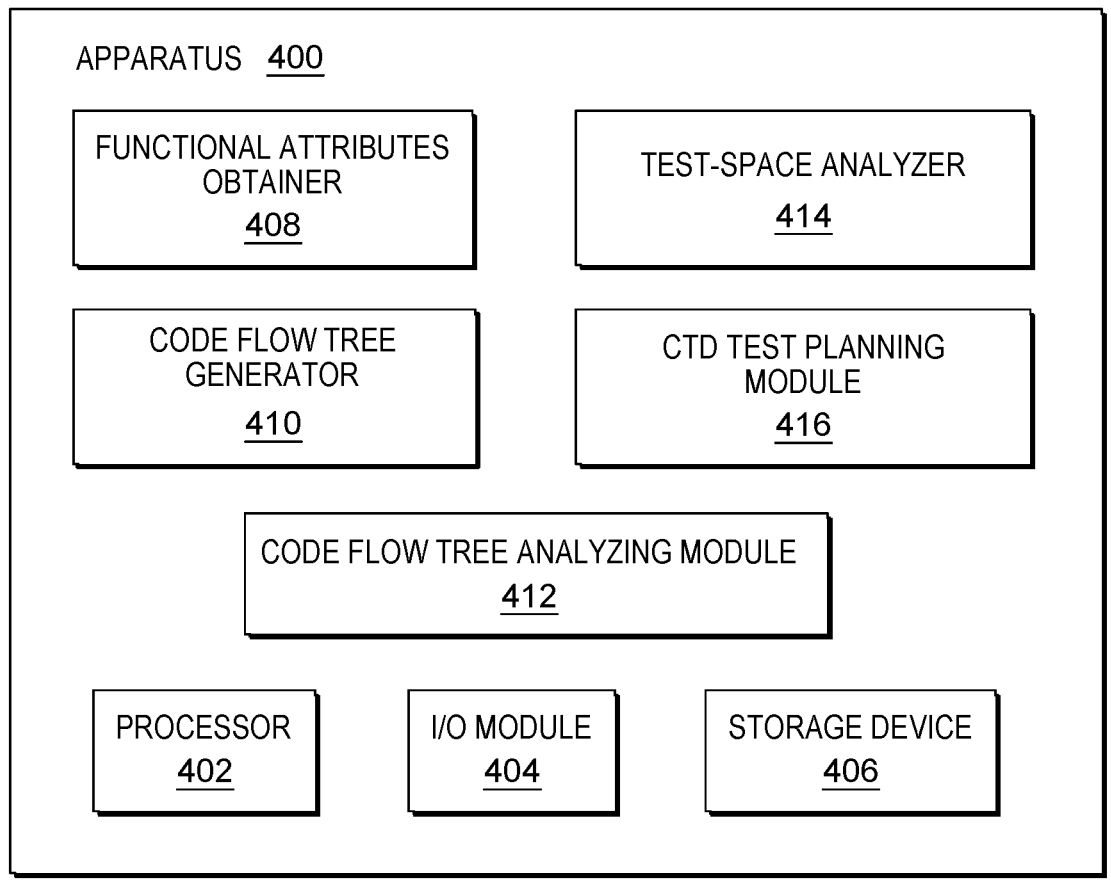
FIG. 4 shows a block diagram of components of an apparatus, in accordance with embodiments of the present invention.

Referring now to FIG. 4 showing a block diagram of components of an apparatus, in accordance with embodiments of the present invention. Apparatus 400 may be configured to represent a functional coverage test-space is using a symbolic representation, such as a BDD. The apparatus 400 may be configured to perform the method disclosed in FIG. 3. The apparatus 400 may provide the functionalities of the functional coverage model defining tool 102, the functional coverage analysis tool 104, the test planning tool 106 or the like.

A functional attributes obtainer 408 may be configured to obtain the functional attributes and define for each attribute a domain, such as based on a user selection or definition.

A code flow tree generator 410 may be configured to encode the test-space using a plurality of code flow trees (e.g., BDDs). The code flow tree generator 410 may generate the BDDs in a similar manner to that described with respect to step 308 of FIG. 3.

A code flow tree analyzing module 412 may be configured to select an optimal code flow tree to achieve the objective of the test suite based on the analyzed complexity of the generated plurality of code flow trees. In one embodiment, the code flow tree analyzing module 412 may employ a machine learning model, such as disclosed with respect to steps 310 and 312 of FIG. 3.

A test-space analyzer 414 may be configured to assist in the analysis in defining the test-space and/or in determining a test plan based on the test-space. The test-space analyzer 414 may be configured to provide functionalities such as described with respect to step 304 of FIG. 3.

A test planning module may be configured to determine a test plan. In some exemplary embodiments, the test planning module may be a CTD test planning module 416 configured to determine a test plan in accordance with CTD. The test plan may be designed to cover all interactions of a predetermined number of functional attributes, such as two, three, four, or the like. The CTD test planning module 418 may provide functionalities such as described with respect to step 306 of FIG. 3.

In some exemplary embodiments, the apparatus 400 may comprise a processor 402. The processor 402 may be a Central Processing Unit (CPU), a microprocessor, an electronic circuit, an Integrated Circuit (IC) or the like. The processor 402 may be utilized to perform computations required by the apparatus 400 or any of its subcomponents.

In some exemplary embodiments of the present invention, the apparatus 400 may comprise an Input/Output (I/O) module 404. The I/O module 404 may be utilized to provide an output to and receive input from the user 110. The I/O module 404 may provide for an interface to external modules, tools, devices, or the like. The I/O module 404 may be utilized to obtain information from the user, such as for the functional attributes obtainer 408. The I/O module 404 may obtain from a user an objective of a test suite, a coverage task to examine or the like. In some exemplary embodiments, the I/O module 404 may provide an output to the user 110 such as the test plan, the optimal code flow tree to achieve the objective of the test or the like. In some exemplary embodiments, the I/O module 404 may be configured to provide the dynamic verification tool 108 with the test plan to be performed.

In some exemplary embodiments, the apparatus 400 may comprise a storage device 406. The storage device 406 may be a hard disk drive, a Flash disk, a Random-Access Memory (RAM), a memory chip, or the like. In some exemplary embodiments, the storage device 406 may retain program code operative to cause the processor 402 to perform acts associated with any of the subcomponents of the apparatus 400. In some exemplary embodiments, the storage device 406 may retain the code flow trees utilized by the apparatus.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The terminology used herein is for the purpose of describing particular embodiments only and is not intended to be limiting of the invention. As used herein, the singular forms "a" and "an" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for identifying optimal tests, the method comprising:
    defining functional coverage by a test suite based on a functional coverage model of a System Under Test (SUT), wherein the test suite comprises a plurality of tests, wherein the functional coverage model comprises a plurality of attributes, each of the plurality of attributes having a set of possible values and wherein the functional coverage model defines possible combinations of values of the attributes as covered by the test suite;
    determining a subset of the possible combinations of values, wherein the subset is characterized in covering all pairwise combinations of the possible combinations of values;
    selecting a subset of the plurality of tests, wherein the selected subset of the plurality of tests is operative to cover the determined subset of the possible combinations of values;
    generating a plurality of trees to graphically represent whether or not all of the possible combinations of values of the attributes from the functional coverage model are tested by the selected subset of the plurality of tests, each tree being a binary decision diagram that represents a source code path in the SUT executed by a test from the selected subset of the plurality of tests, wherein each binary decision diagram represents a combination of values potentially used to execute the test, wherein each node in each binary decision diagram represents an attribute, each edge from a node represents a value assigned to the attribute, and wherein each path in each binary decision diagram indicates a distinct combination of values potentially used for the plurality of attributes when executing the test, a path being a set of edges from root node to a leaf node;
    analyzing a complexity of the generated plurality of binary decision diagrams based on user-specified criteria, wherein the complexity of the generated plurality of trees is analyzed using data mining, statistical analysis, predictive analysis, data modeling, and machine-learning algorithms, and wherein analyzing the complexity further comprises analyzing a shape, depth, breadth, total number of edges, total number of nodes of each of the plurality of trees, wherein the different order of the nodes in the binary decision diagrams result in differing complexities; and
    identifying an optimal binary decision diagram from the subset of the plurality of binary decision diagrams to achieve an objective of the test suite based on the analyzed complexity of the generated plurality of binary decision diagrams.

2. The method of claim 1, wherein the selected subset of the plurality of tests excludes combinations that are restricted by a set of restrictions over the plurality of attributes and associated domains.

3. A system for identifying optimal tests, the system comprising:
    a memory having computer-readable instructions; and
    one or more processors for executing the computer-readable instructions, the computer-readable instructions comprising:
        instructions for defining functional coverage by a test suite based on a functional coverage model of a System Under Test (SUT), wherein the test suite comprises a plurality of tests, wherein the functional coverage model comprises a plurality of attributes, each of the plurality of attributes having a set of possible values and wherein the functional coverage model defines possible combinations of values of the attributes as covered by the test suite;
        instructions for determining a subset of the possible combinations of values, wherein the subset is characterized in covering all pairwise combinations of the possible combinations;

instructions for selecting a subset of the plurality of tests, wherein the selected subset of the plurality of tests is operative to cover the determined subset of the possible combinations of values;

instructions for generating a plurality of trees to graphically represent whether or not all of the possible combinations of values of the attributes from the functional coverage model are tested by the selected subset of the plurality of tests, each tree being a binary decision diagram that represents a source code path in the SUT executed by a test from the selected subset of the plurality of tests, wherein each binary decision diagram represents a combination of values potentially used to execute the test, wherein each node in each binary decision diagram represents an attribute, each edge from a node represents a value assigned to the attribute, and wherein each path in each binary decision diagram indicates a distinct combination of values potentially used for the plurality of attributes when executing the test, a path being a set of edges from root node to a leaf node;

instructions for analyzing a complexity of the generated plurality of binary decision diagrams based on user-specified criteria, wherein the complexity of the generated plurality of trees is analyzed using data mining, statistical analysis, predictive analysis, data modeling, and machine-learning algorithms, and wherein analyzing the complexity further comprises analyzing a shape, depth, breadth, total number of edges, total number of nodes of each of the plurality of trees, wherein the different order of the nodes in the binary decision diagrams result in differing complexities; and instructions for identifying an optimal binary decision diagram from the subset of the plurality of binary decision diagrams to achieve an objective of the test suite based on the analyzed complexity of the generated plurality of binary decision diagrams.

4. The system of claim 3, wherein the selected subset of the plurality of tests excludes combinations that are restricted by a set of restrictions over the plurality of attributes and associated domains.

5. A computer-program product for identifying optimal tests, the computer-program product comprising a non-transitory computer-readable storage medium having program instructions embodied therewith, the program instructions executable by a processor to cause the processor to perform a method comprising:

defining functional coverage by a test suite based on a functional coverage model of a System Under Test (SUT), wherein the test suite comprises a plurality of tests, wherein the functional coverage model comprises a plurality of attributes, each of the plurality of attributes having a set of possible values and wherein the functional coverage model defines possible combinations of values of the attributes as covered by the test suite;

determining a subset of the possible combinations of values, wherein the subset is characterized in covering all pairwise combinations of the possible combinations;

selecting a subset of the plurality of tests, wherein the selected subset of the plurality of tests is operative to cover the determined subset of the possible combinations of values;

generating a plurality of trees to graphically represent whether or not all of the possible combinations of values of the attributes from the functional coverage model are tested by the selected subset of the plurality of tests, each tree being a binary decision diagram that represents a source code path in the SUT executed by a test from the selected subset of the plurality of tests, wherein each binary decision diagram represents a combination of values potentially used to execute the test, wherein each node in each binary decision diagram represents an attribute, each edge from a node represents a value assigned to the attribute, and wherein each path in each binary decision diagram indicates a distinct combination of values potentially used for the plurality of attributes when executing the test, a path being a set of edges from root node to a leaf node;

analyzing a complexity of the generated plurality of binary decision diagrams based on user-specified criteria, wherein the complexity of the generated plurality of trees is analyzed using data mining, statistical analysis, predictive analysis, data modeling, and machine-learning algorithms, and wherein analyzing the complexity further comprises analyzing a shape, depth, breadth, total number of edges, total number of nodes of each of the plurality of trees, wherein the different order of the nodes in the binary decision diagrams result in differing complexities; and identifying an optimal binary decision diagram from the subset of the plurality of binary decision diagrams to achieve an objective of the test suite based on the analyzed complexity of the generated plurality of binary decision diagrams.

* * * * *